(12) United States Patent
Devereaux et al.

(10) Patent No.: US 11,512,816 B2
(45) Date of Patent: *Nov. 29, 2022

(54) SYSTEMS AND METHODS FOR REPORTING PIPELINE PRESSURES

(71) Applicant: Aclara Technologies, LLC, St. Louis, MO (US)

(72) Inventors: Peggy Devereaux, St. Louis, MO (US); Vaishali Sangtani, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,840

(22) Filed: Feb. 23, 2021

(65) Prior Publication Data

US 2021/0254791 A1  Aug. 19, 2021

Related U.S. Application Data

(63) Continuation of application No. 15/449,763, filed on Mar. 3, 2017, now Pat. No. 10,935,188.

(60) Provisional application No. 62/304,019, filed on Mar. 4, 2016.

(51) Int. Cl.
*F17D 3/01* (2006.01)
*G01L 19/08* (2006.01)

(52) U.S. Cl.
CPC .............. *F17D 3/01* (2013.01); *G01L 19/08* (2013.01); *G01L 19/086* (2013.01)

(58) Field of Classification Search
CPC .......... F17D 3/01; G01L 19/08; G01L 19/086
See application file for complete search history.

(56) References Cited

U.S. PATENT DOCUMENTS

| | | | |
|---|---|---|---|
| 6,389,881 B1 | 5/2002 | Yang | |
| 6,778,100 B2 * | 8/2004 | Schempf | F17D 3/01 340/870.07 |
| 8,390,472 B2 | 3/2013 | Cornwall | |
| 8,896,461 B2 | 11/2014 | Angelis et al. | |
| 9,197,467 B2 | 11/2015 | Picard | |
| 10,151,782 B2 | 12/2018 | Sum et al. | |
| 10,598,709 B2 | 3/2020 | Sum et al. | |
| 10,935,188 B2 * | 3/2021 | Devereaux | G01L 19/086 |
| 2004/0259520 A1 | 12/2004 | Steel | |
| 2005/0146431 A1 | 7/2005 | Hastings | |
| 2013/0030577 A1 * | 1/2013 | Jarrell | G01M 3/24 700/282 |
| 2015/0308627 A1 * | 10/2015 | Hoskins | E03B 7/00 702/45 |
| 2021/0151974 A1 | 5/2021 | Borisov | |

* cited by examiner

*Primary Examiner* — Fekadeselassie Girma
*Assistant Examiner* — Mancil Littlejohn, Jr.
(74) *Attorney, Agent, or Firm* — Michael Best & Friedrich LLP

(57) ABSTRACT

An optimized, energy-sensitive system and method for fulfilling various data needs of gas utilities. In particular, the disclosure relates to optimized methods for discovering and reacting to an alarm. In one aspect, when an alarm is triggered a telemetry unit automatically alters its operating mode to begin transmitting live pressure reads every minute instead of every hour, as typically performed. This variance in operation eliminates the need for a user to monitor a pipeline system for an incoming alarm and manually request data by initiating a live communication session.

20 Claims, 11 Drawing Sheets

| Minute | 0 | 1 | 2 | 3 | 4 | 5 | 6 | 7 | 8 | 9 | 10 | 11 | | |
|---|---|---|---|---|---|---|---|---|---|---|---|---|---|---|
| 0 | 0 NA | NA | NA | NA | NA | NA | NA | NA | NA | NA | NA | NA | | Send 0x21/0x05 seq 00 over pressure |
| 1 | 1 | 0 NA | 0 NA | NA | NA | NA | NA | NA | NA | NA | NA | NA | | |
| 2 | 2 | 1 | 1 | 0 NA | NA | NA | NA | NA | NA | NA | NA | NA | | |
| 3 | 3 | 2 | 2 | 1 | 0 NA | NA | NA | NA | NA | NA | NA | NA | | |
| 4 | 4 | 3 | 3 | 2 | 1 | 0 NA | NA | NA | NA | NA | NA | NA | | |
| 5 | 5 | 4 | 4 | 3 | 2 | 1 | NA | NA | NA | NA | NA | NA | Send 0x41 | |
| 6 | 6 | 5 | 5 | 4 | 3 | 2 | 1 | NA | NA | NA | NA | NA | | |
| 7 | 7 | 6 | 6 | 5 | 4 | 3 | 2 | 0 NA | NA | NA | NA | NA | | |
| 8 | 8 | 7 | 7 | 6 | 5 | 4 | 3 | 1 | 0 NA | NA | NA | NA | | |
| 9 | 9 | 8 | 8 | 7 | 6 | 5 | 4 | 2 | 1 | 0 NA | NA | NA | | |
| 10 | 10 | 9 | 9 | 8 | 7 | 6 | 5 | 3 | 2 | 1 | 0 NA | NA | | |
| 11 | 11 | 10 | 10 | 9 | 8 | 7 | 6 | 4 | 3 | 2 | 1 | 0 | Send 0x41 | |
| 12 | 12 | 11 | 11 | 10 | 9 | 8 | 7 | 5 | 4 | 3 | 2 | 1 | | |
| 13 | 13 | 12 | 12 | 11 | 10 | 9 | 8 | 6 | 5 | 4 | 3 | 2 | | |
| 14 | 14 | 13 | 13 | 12 | 11 | 10 | 9 | 7 | 6 | 5 | 4 | 3 | | |
| 15 | 15 | 14 | 14 | 13 | 12 | 11 | 10 | 8 | 7 | 6 | 5 | 4 | | |
| 16 | 16 | 15 | 15 | 14 | 13 | 12 | 11 | 9 | 8 | 7 | 6 | 5 | | |
| 17 | 17 | 16 | 16 | 15 | 14 | 13 | 12 | 10 | 9 | 8 | 7 | 6 | Send 0x41 | |
| 18 | 18 | 17 | 17 | 16 | 15 | 14 | 13 | 11 | 10 | 9 | 8 | 7 | | |
| 19 | 19 | 18 | 18 | 17 | 16 | 15 | 14 | 12 | 11 | 10 | 9 | 8 | | |
| 20 | 20 | 19 | 19 | 18 | 17 | 16 | 15 | 13 | 12 | 11 | 10 | 9 | | |
| 21 | 21 | 20 | 20 | 19 | 18 | 17 | 16 | 14 | 13 | 12 | 11 | 10 | | |
| 22 | 22 | 21 | 21 | 20 | 19 | 18 | 17 | 15 | 14 | 13 | 12 | 11 | | |
| 23 | 23 | 22 | 22 | 21 | 20 | 19 | 18 | 16 | 15 | 14 | 13 | 12 | Send 0x41 | |
| 24 | 24 | 23 | 23 | 22 | 21 | 20 | 19 | 17 | 16 | 15 | 14 | 13 | | |
| 25 | 25 | 24 | 24 | 23 | 22 | 21 | 20 | 18 | 17 | 16 | 15 | 14 | | |
| 26 | 26 | 25 | 25 | 24 | 23 | 22 | 21 | 19 | 18 | 17 | 16 | 15 | | |
| 27 | 27 | 26 | 26 | 25 | 24 | 23 | 22 | 20 | 19 | 18 | 17 | 16 | | |
| 28 | 28 | 27 | 27 | 26 | 25 | 24 | 23 | 21 | 20 | 19 | 18 | 17 | | |
| 29 | 29 | 28 | 28 | 27 | 26 | 25 | 24 | 22 | 21 | 20 | 19 | 18 | Send 0x41 | |
| 30 NA | | 29 | 29 | 28 | 27 | 26 | 25 | 23 | 22 | 21 | 20 | 19 | | |
| 31 NA | NA | | | 29 | 28 | 27 | 26 | 24 | 23 | 22 | 21 | 20 | | |
| 32 NA | NA | NA | NA | | 29 | 28 | 27 | 25 | 24 | 23 | 22 | 21 | | |
| 33 NA | NA | NA | NA | NA | | 29 | 28 | 26 | 25 | 24 | 23 | 22 | | |
| 34 NA | NA | NA | NA | NA | NA | | 29 | 27 | 26 | 25 | 24 | 23 | | |
| 35 NA | NA | NA | NA | NA | NA | NA | | 28 | 27 | 26 | 25 | 24 | Send 0x41 | |

*(Screen 50 — ACLARA trend mode interface)*

THIS MTU IN TREND MODE

CANCEL TREND MODE

CONSIDER CANCELING TREND MODE IF THE TRIGGER WAS BENIGN – E.G., ON INSTALLATION TEST, MAINTENANCE, ETC. IT CAN SIGNIFICANTLY SAVE THE TU BATTERY LIFE

TRIGGER ALARM

| ITEM CODE | ALARM NAME | FLAG | DATE & TIME | P1 PRESSURE |
|---|---|---|---|---|
| 553 | P1 PRESSURE HIGH | SET | 10/10/2016 9:34 AM | 38.27 |
| 555 | P2 PRESSURE HIGH | SET | 10/10/2016 9:15 AM | 42.19 |

TREND DATA FOR P1

| TIME | P1 PRESSURE |
|---|---|
| 9:39 AM | 36.95 |
| 9:38 AM | 37.41 |
| 9:37 AM | 37.92 |
| 9:36 AM | 38.17 |
| 9:35 AM | 38.29 |
| 9:34 AM | 38.22 |

« ‹ 1 / 1 › »

TREND DATA FOR P2

| TIME | P2 PRESSURE |
|---|---|
| 9:39 AM | 38.16 |
| 9:38 AM | 38.23 |
| 9:37 AM | 39.91 |
| 9:36 AM | 39.97 |
| 9:35 AM | 40.11 |
| 9:34 AM | 40.84 |

« ‹ 1 / 3 › »

SYSTEMS AND METHODS FOR REPORTING PIPELINE PRESSURES

CROSS REFERENCE TO RELATED APPLICATIONS

This application is a continuation of, and claims priority to, U.S. patent application Ser. No. 15/449,763 (now U.S. Pat. No. 10,935,188) filed Mar. 3, 2017, which claims the benefit of, and priority to, U.S. Provisional Patent Application No. 62/304,019, filed Mar. 4, 2016, the contents both of which are hereby incorporated herein in their entirety.

BACKGROUND

Gas pipeline safety regulation acts like Distribution Pipeline Integrity Management Program Rule and Pipeline Safety, Regulatory Certainty, and Job Creation Act have enforced proactive monitoring, data gathering, reporting, and oversight expectations from utilities over their gas distribution mains and other high consequence areas. Some gas utilities use paper chart recorders with field visits, while others use mechanical Data loggers installed at identified low/high pressure points on the networks. Other efforts to proactively monitor gas pipelines rely on pressure telemeters at limited scattered points that communicate with supervisory control and data acquisition (SCADA) systems.

It is with these issues in mind, among others, that various aspects of the disclosure were conceived. In the power distribution segment, gas utilities have always lagged behind their electric peers in distribution automation and monitoring capabilities, mainly due to the inherit limitations of typical battery-operated monitoring devices and existing telemetry units used on gas distribution networks. These must be battery-operated in order to have hazardous material safety compliance. As such, these devices are unable to operate in an always in ON mode and hence two-way communication capability is limited, unlike devices associated with electricity transmission.

SUMMARY

The present disclosure generally relates to optimized, energy-sensitive systems and methods for fulfilling various data needs of utilities, including but not limited to gas utilities, water utilities, and waste management utilities among others. In particular, the disclosure relates to optimized methods for discovering and reacting to an alarm. In one aspect, when an alarm is triggered, a telemetry unit automatically alters its operating mode to begin transmitting or sending live pressure reads every minute instead of every hour, as typically performed in various embodiments. In other embodiments, the systems and methods disclosed herein may be used for gathering other data points including but not limited to temperature, water levels, waste levels, and flow rates among others. This variance in operation eliminates the need for a user to monitor a pipeline system for an incoming alarm and then manually request data by initiating a live communication session.

The reporting process is automated by a system where the endpoint sensors and other equipment have the programmed intelligence to monitor for incoming alarms and automatically switch its mode of operation to begin sending more granular data. In one aspect, one advantage of the present disclosure is that the systems and methods disclosed herein automatically determine when additional granular pressure data might be desired based on one or more qualifying events. By eliminating the requirement for user interaction to request the data, energy optimization for various battery-operated devices is achieved by permitting them to remain in low-power consuming modes of operation for as long as possible.

According to one aspect, a system for reporting pipeline pressure data includes a sensory unit in communication with a portion of a utility network and a telemetry unit. The telemetry unit is in communication with a data collection unit and transmits data from the sensory unit to the data collection unit at a first interval. The data collection unit is also in communication with a headend unit. When the telemetry unit receives an alarm signal from the sensory unit, it polls the sensory unit in response to an alarm signal. The telemetry unit then transmits live data reads to the data collection unit at a second interval that is typically shorter than the first interval.

According to another aspect, a method for reporting pipeline pressure data includes monitoring a portion of a utility network with a sensory unit and generating an alarm signal at the sensory unit. The method also includes receiving the alarm signal at a telemetry unit and determining if the alarm signal meets user-defined criteria to initiate a trend mode of operation. When the alarm signal meets the user-defined criteria, the telemetry unit automatically initiates trend mode operation. The trend mode operation includes polling the sensory unit at a trend mode interval to gather live data and transmitting the live data to the data collection unit at a transmission interval. The method also includes cessation of the trend mode and continuation of the standard operation after cessation of the alarm signal. In various aspects, standard operation is continued even when trend mode is initiated. As such, the systems and methods continuously operate in the standard mode regardless of the trend mode initiation, unless altered by an operator.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment.

FIGS. 3A-C are charts illustrating example data transmissions by a telemetry unit of the utility monitoring system according to some embodiments.

FIGS. 4-6 are example graphical user interfaces that may be generated and displayed at a computing device of the utility monitoring system according to one embodiment.

DETAILED DESCRIPTION

Figure 1:
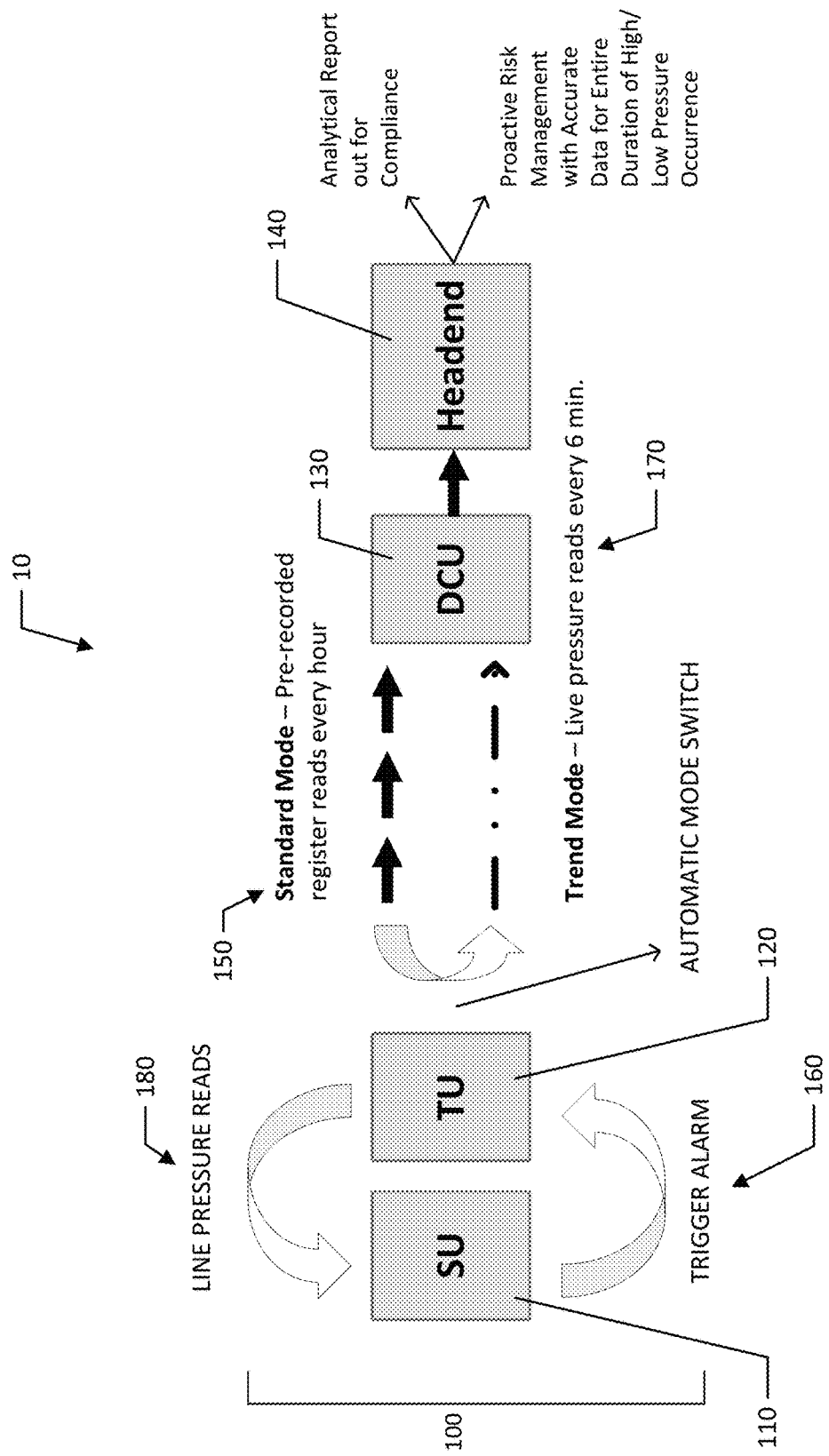
FIG. 1 is a block diagram of an embodiment of a utility monitoring system according to one embodiment.

For promoting an understanding of the principles of the present disclosure, reference will now be made to the embodiments illustrated in the drawings, and specific language will be used to describe the same. Nevertheless, it will be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates.

Aspects of this disclosure relate to a trending mode ("trend mode") system and method whereby data of interest is automatically pushed to a user in response to an alarm condition. Moreover, the trend mode system and method may select and vary the types of data and the transmission intervals for the data based on user-defined conditions, intervals, and preferences. As described more fully below, the automatic "data pushing" trend mode operation systems and methods of the present disclosure offer a number of advantages over existing data "pull" systems and schemes. For example, data pull systems require on-location sensors and equipment to use their limited power supplies to first receive a request from a user, identify the data requested, and transmit the data back to the user. In contrast, the trend mode system and methods allow for the on-location sensors and equipment to remain in low-power "sleep" modes for greater periods and then transmit data in response to predetermined conditions, such that the sensors and equipment may save energy and conserve their limited power supplies.

In one embodiment, the trend mode system 10 uses endpoint intelligence embodied in software, code, or other instructions executable by a processor or controller at endpoint hardware to automatically select the appropriate communication interval and data granularity. Typically, the endpoint hardware is located in the field, at one or more remote locations, and in communication with other systems, hardware, and software located at a user facility (e.g., utility company facility).

Figure 2:
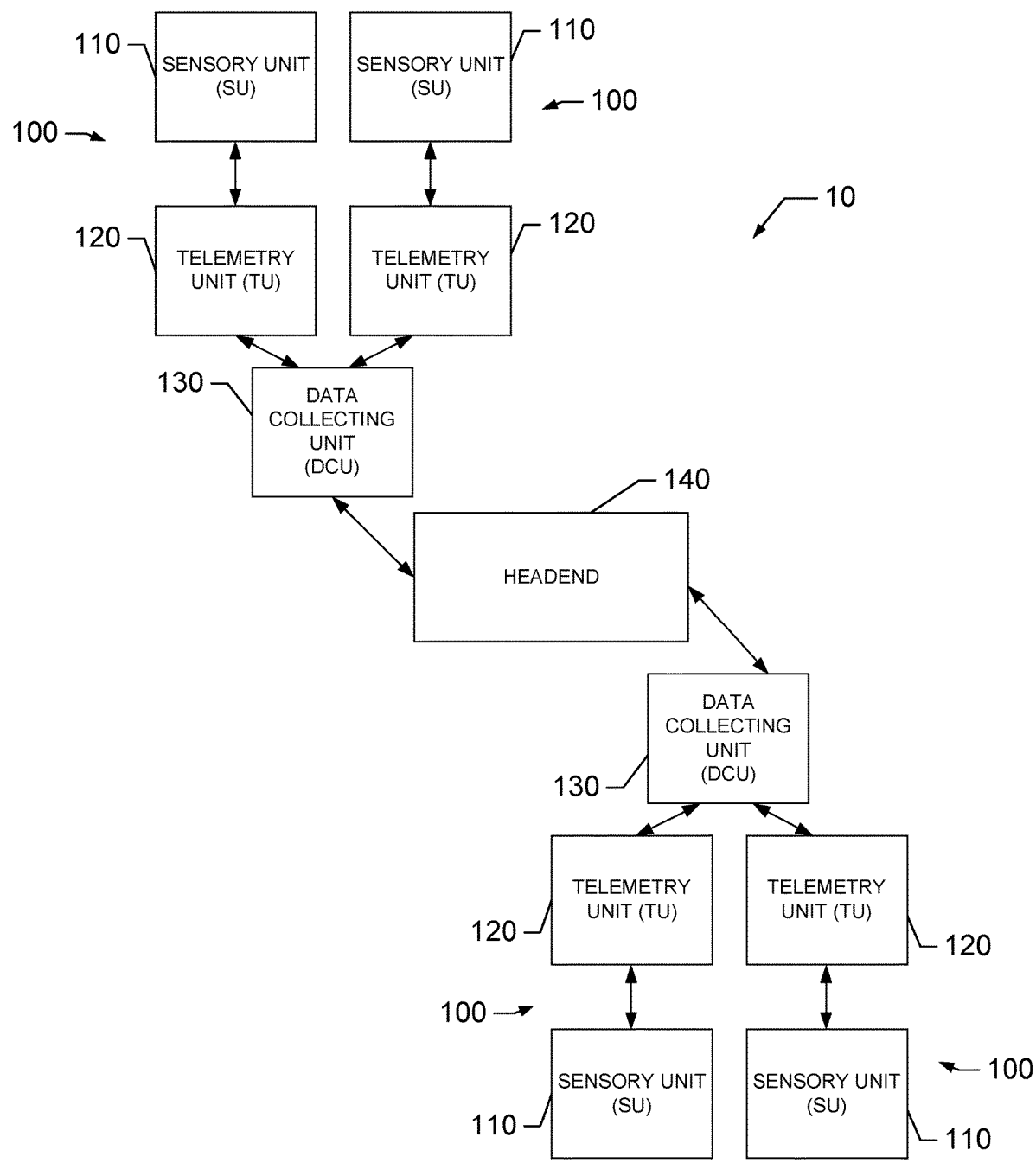
FIG. 2 is a block diagram of an embodiment of another utility monitoring system according to one embodiment.
Figure 4:
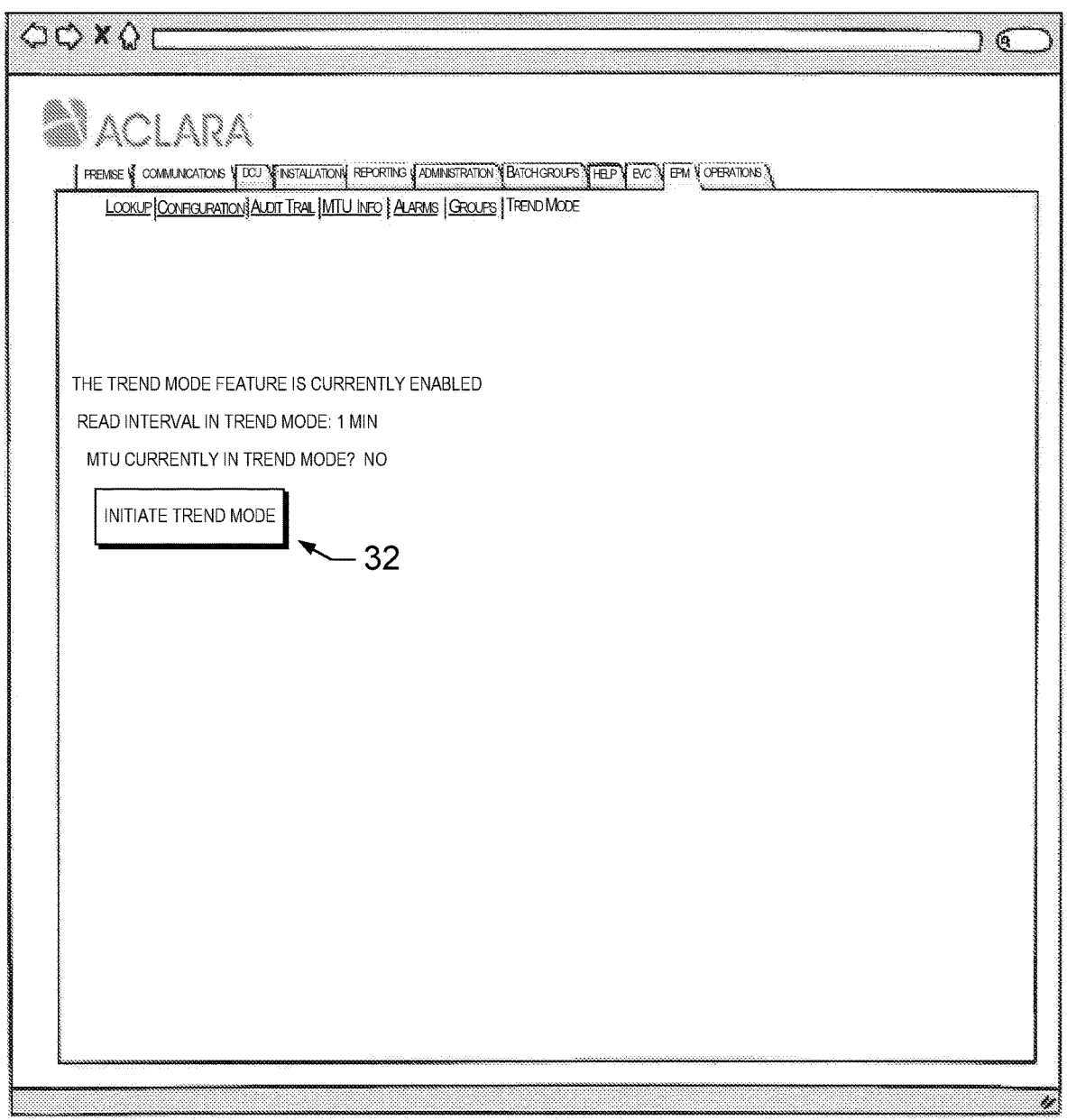
Figure 5:
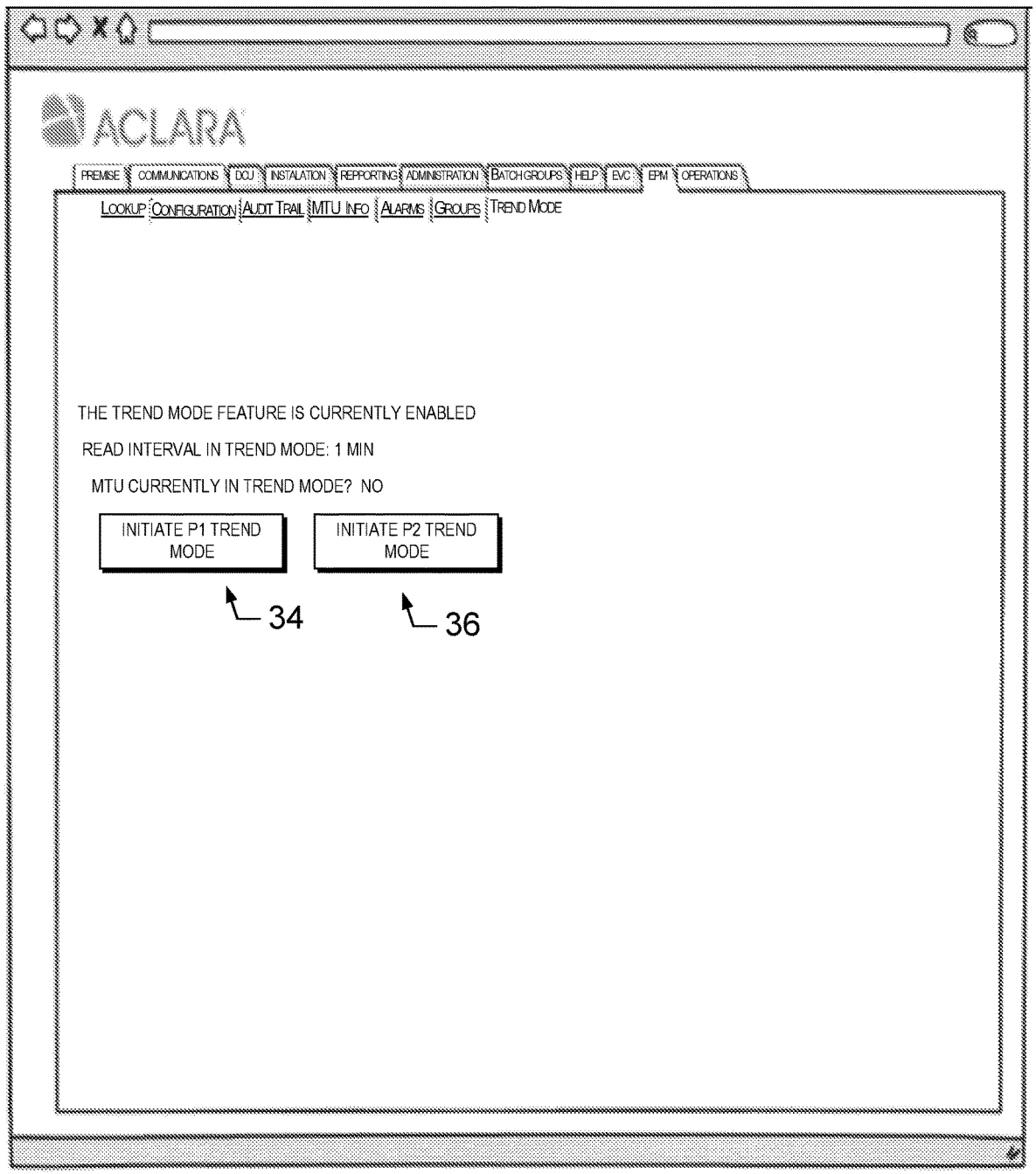

FIG. 1 shows a block diagram of one embodiment of the trend mode system 10. The trend mode 10 system includes endpoint hardware 100 in communication with a data collection unit (DCU) 130 that is also in communication with a headend system 140 located at an office or other facility of a utility company. In one aspect, the endpoint hardware 100 may include a sensory unit (SU) 110 and a telemetry unit (TU) 120. The sensory unit gathers data from the utility distribution system (e.g., a pipeline) and generates alarms, if necessary, based on the gathered data. The sensory unit 110 may be any monitoring equipment suitable for monitoring at least a portion of a utility distribution or transportation network. In one example, the sensory unit measures the temperature, water level, waste level, and flow rates, among others for utility networks including but not limited to distribution or transport networks for gas, water, and waste among others. The sensory unit 110 is in communication with the telemetry unit 120, which includes a first transceiver to interface with the sensory unit 110. A second transceiver (of the telemetry unit 120) transmits the sensor data to the data collection unit 130. Typically, each data collection unit 130 receives data from one or more telemetry units 120, each associated with one or more sensory units 110, as shown in FIG. 2. In one aspect, the sensory units 110 are in wired communication with a corresponding telemetry unit 120. Alternatively, one or more sensory units 110 may be in wireless communication with a telemetry unit 120. Typically, the telemetry unit(s) 120 communicate with the data collecting unit(s) 130 using wireless communication, including but not limited to radio frequency communications; however, other communication means may be used. As such, a single data collecting unit may be positioned to receive data from telemetry units 120 over a wide area. Typically, the data collecting unit(s) 130 also communicate using wireless communication with the headend systems 140; however, this usually relies on cellular or microwave communications to transmit data over long distances. In operation, the system 10 automatically changes the transmission frequency and, optionally, the type of sensor data, transmitted by the telemetry unit 120. For example, the telemetry unit 120 automatically switches from a typical mode of operation where pre-recorded data registers or tables containing stored sensor data are transmitted hourly, to a live transmission mode where the telemetry unit transmits data from the sensory unit 110, at user-defined intervals upon receiving a specific type of alarm from the sensory unit.

Under ordinary circumstances, as shown in FIG. 1, the telemetry unit 120 operates in a standard mode, waking up to read and send pre-recorded register reads every hour then resuming sleep mode to conserve battery, generally indicated as 150. If an alarm condition is detected by the sensory unit 110, the sensory unit generates a trigger alarm signal 160 that is sent to the telemetry unit. In one aspect, the alarm signal is a pulse signal.

In response to the alarm signal 160, a processor of the telemetry unit 120 wakes up from the sleep mode, or continues a standard data transmission and automatically switches to a trend mode of operation, generally indicated as 170, and begins to poll the sensory unit 110 for live, real-time, or near real time sensor data, indicated as 180, simultaneously. The telemetry unit 120 transmits the live sensor data at user-defined trend mode intervals. The trend mode intervals are shorter than the typical hourly intervals of the standard mode 150. For example, the trend mode intervals may be 6 minutes, however other duration intervals may be used as the trend mode interval is defined and configurable by a user of the system.

In one aspect, the telemetry unit 120 automatically ceases the trend mode operation and continues the standard operation mode 150 when the alarm condition is cleared and the sensory unit 110 transmits a clear alarm signal. Alternatively, the trend mode of operation 170 may be cancelled by a command or signal that is received from the headend 140. In one embodiment, the telemetry unit 120 is programmed to return to the standard mode 150 after a pre-defined period (e.g., 30 min) if a cancel command has not been received. In various embodiments, the parameters and features of the trend mode system 10, are customizable and may be configured to the needs and desires of the utility company. For example, the alarm conditions that cause an alarm signal 160 and trend mode intervals, among others, can be enabled or disabled in the field at the endpoint hardware by configuring data and instructions stored in memory of the telemetry unit 120. As a result, the utility operator may determine which conditions cause an alarm. In one aspect, alarm conditions and alarm thresholds may be added, removed, or modified remotely by instructions generated at the headend 140. These changes may become effective immediately or at a subsequent time. The granularity of the data transmitted during the trend mode 170 may also be configured in the field or remotely. For example, the trend mode 170 may be configured such that the telemetry unit 120 transmits one minute worth of live data reads every six minutes in a fast trend mode, or may transmit five minutes worth of live data reads every thirty minutes in a slow trend mode. Other combinations of data volume and transmission intervals may be used.

In another aspect, communications for the initiation or cancellation of the trend mode may be generated at the headend 140 and received at the telemetry unit 120. Similarly, the telemetry unit 120 may send a communication to the headend 140 that the trend mode 180 is concluding by indicating that a transmitted data set is the penultimate or the final data set.

Figure 3A:
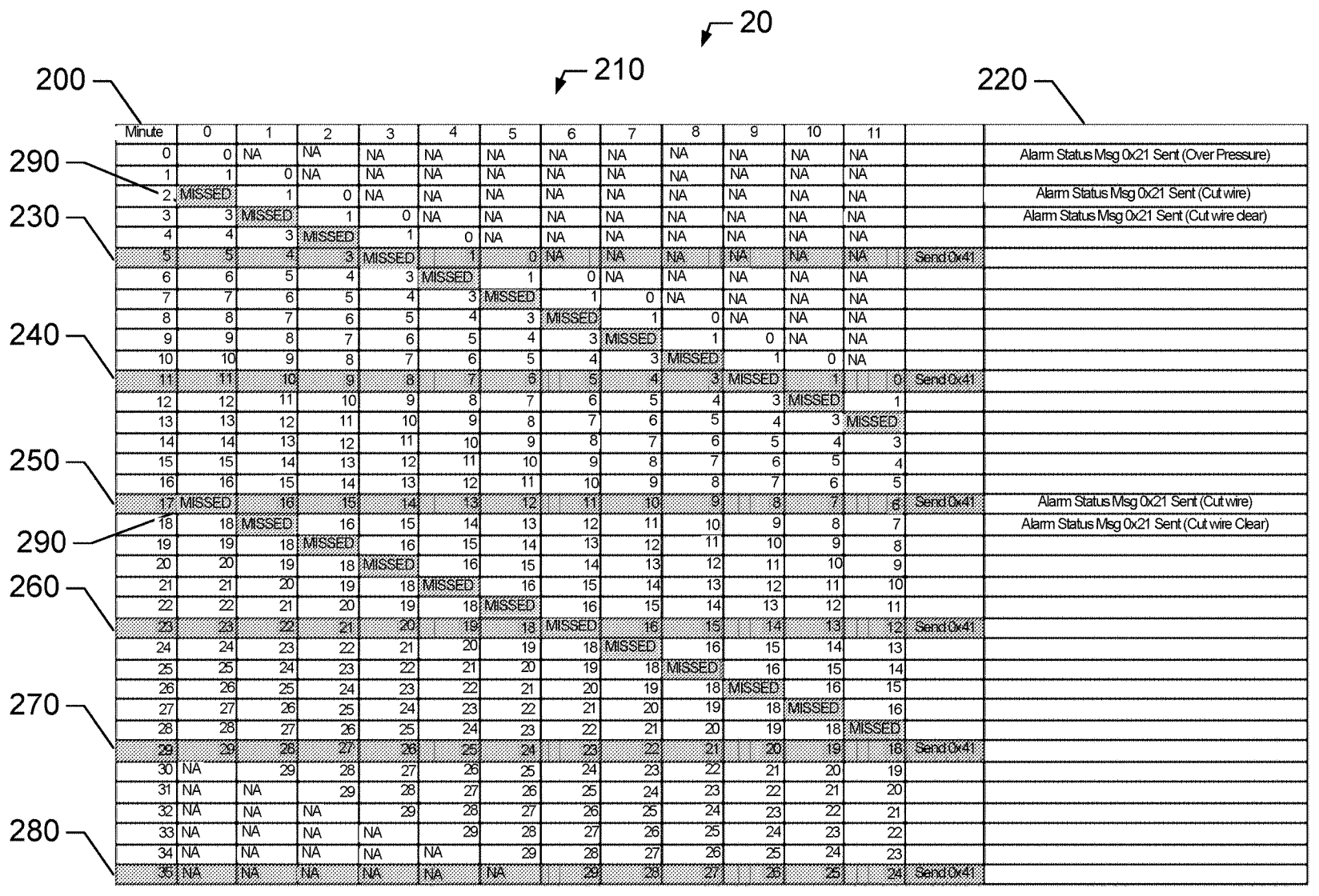

FIG. 3A is an example data table 20 illustrating one embodiment of the data communications transmitted from the telemetry unit 120 when operating in the trend mode 170. As shown in the data table, the left hand column 200 identifies the progression of time in minutes. The remaining columns 210 labeled "0" to "11" identify the twelve live data reads 180 transmitted in every telemetry unit 120 transmission. The right hand column 220 identifies the alarm signal 160, if any received at the telemetry unit 120 from the sensory unit 110. As shown, the trend mode operation was initiated in response to an initial "over pressure signal" alarm signal 160.

In one embodiment of the trend mode 170, a new data read is collected every one minute. At six-minute intervals, the telemetry unit 120 transmits a communication 230, 240, 250, 260, 270, and 280 to the headend 140. The telemetry unit 120 transmissions 230-280 include six new live data reads gathered since the last transmission 230-270, if any, as well as the six most recent old live data reads.

As shown, while in trend mode, the telemetry unit 120 missed two data reads 290 at minute "2" and minute "17." As shown in the alarm signal column 220, the missed data reads corresponded to a disconnected wire, or other broken communication link, between the sensory unit 110 and the telemetry unit 120. Also shown, communication between the sensory unit and the telemetry unit was reestablished prior to the subsequent telemetry unit 120 transmissions 230 and 260.

Figure 3B:
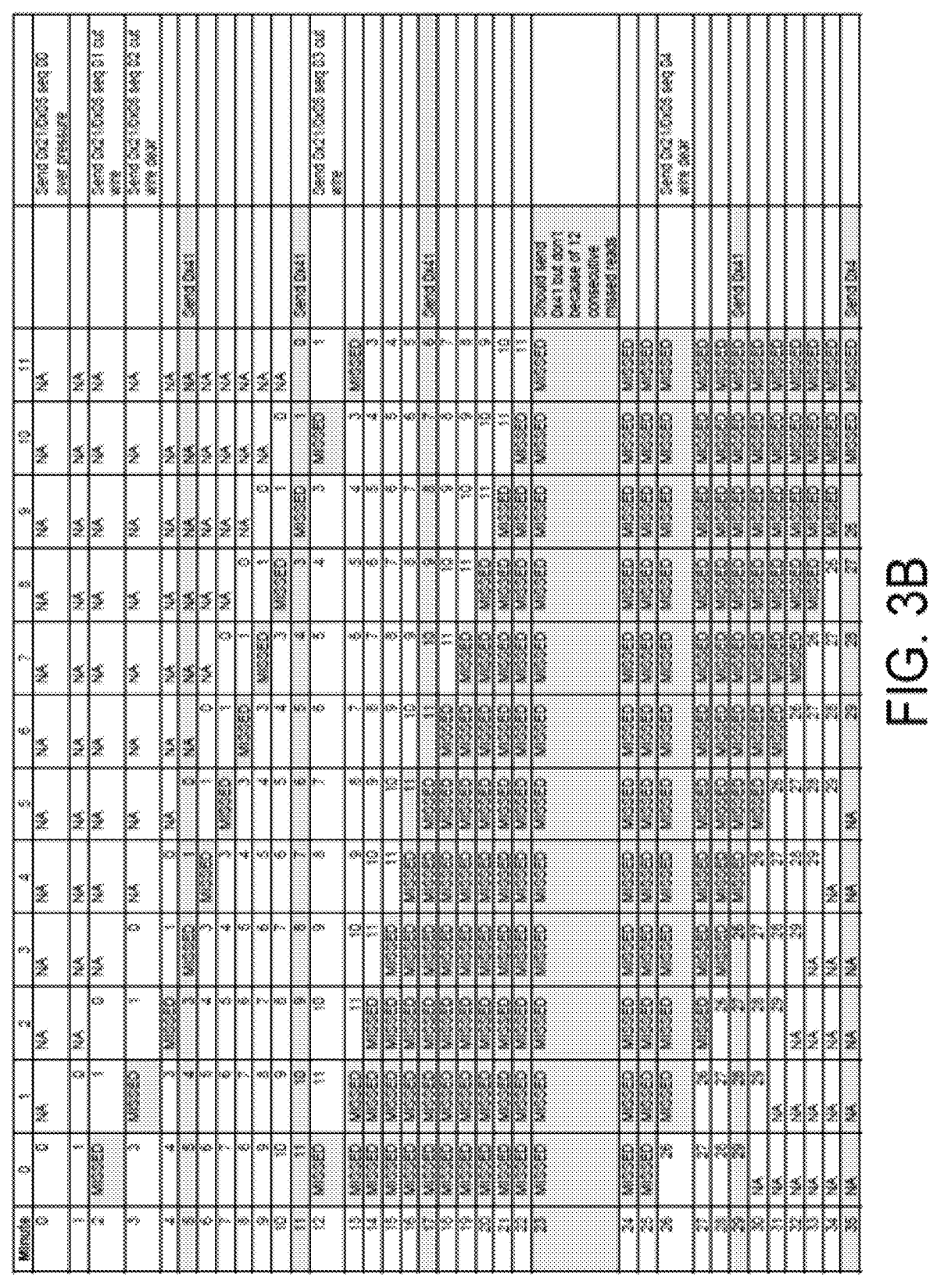

FIG. 3B is another example data table illustrating data communications containing missing data reads that may be transmitted from the telemetry unit 120 when operating in the trend mode 170. Conversely, FIG. 3C is example data table illustrating data communications transmitted from the telemetry unit 120 operating in trend mode where no data reads are missing.

FIGS. 4-6 and 9 are example graphical user interface (GUI) 30-50 displays that may be generated at the headend 140 according to one embodiment. As shown, the GUIs include indications as to whether trend mode is currently enabled in general and whether for one or more specific telemetry units 120 are operating in trend mode, as well as the live data read interval. The GUIs may also include one or more interactive buttons 32-36 to receive input from a user to initiate trend mode operation for the entire network or for particular telemetry units 120. Furthermore, the GUIs may also display the data gathered and generated at the sensory units 110, including read data and alarm data.

Figure 9:
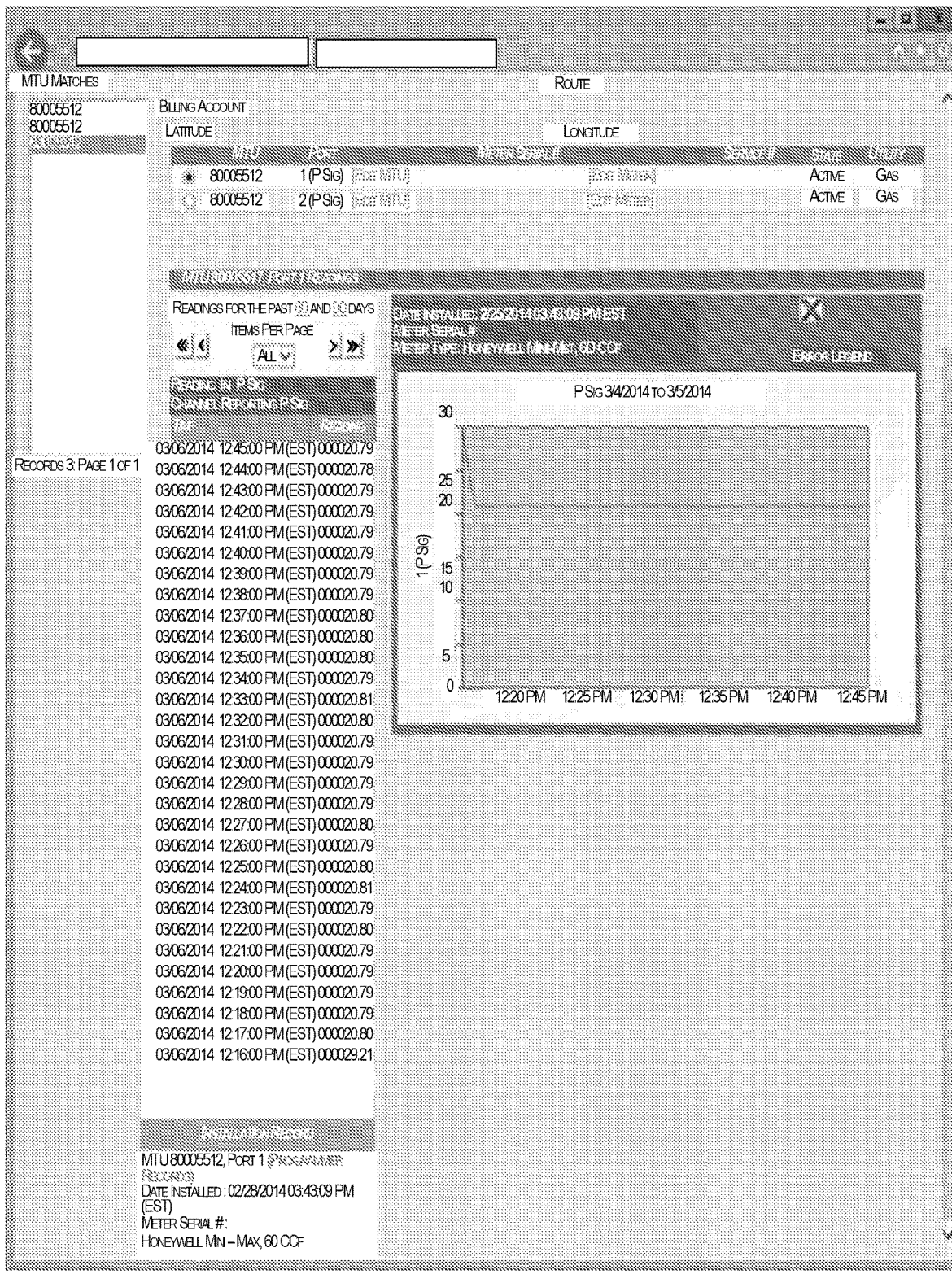
FIG. 9 is another example graphical user interface that may be generated and displayed at a computing device of the utility monitoring system according to one embodiment.

In one embodiment, trend mode data from a telemetry unit 120 may be viewed via a readings GUI, shown in FIG. 9. In one example, as shown, a telemetry unit 120 entered a trend mode of operation in response to a high-pressure alarm condition triggered after a pressure spike. Since the alarm condition cleared within 30 minutes, the trend mode data transmissions were halted after 30 minutes of data had been transmitted.

Figure 7:
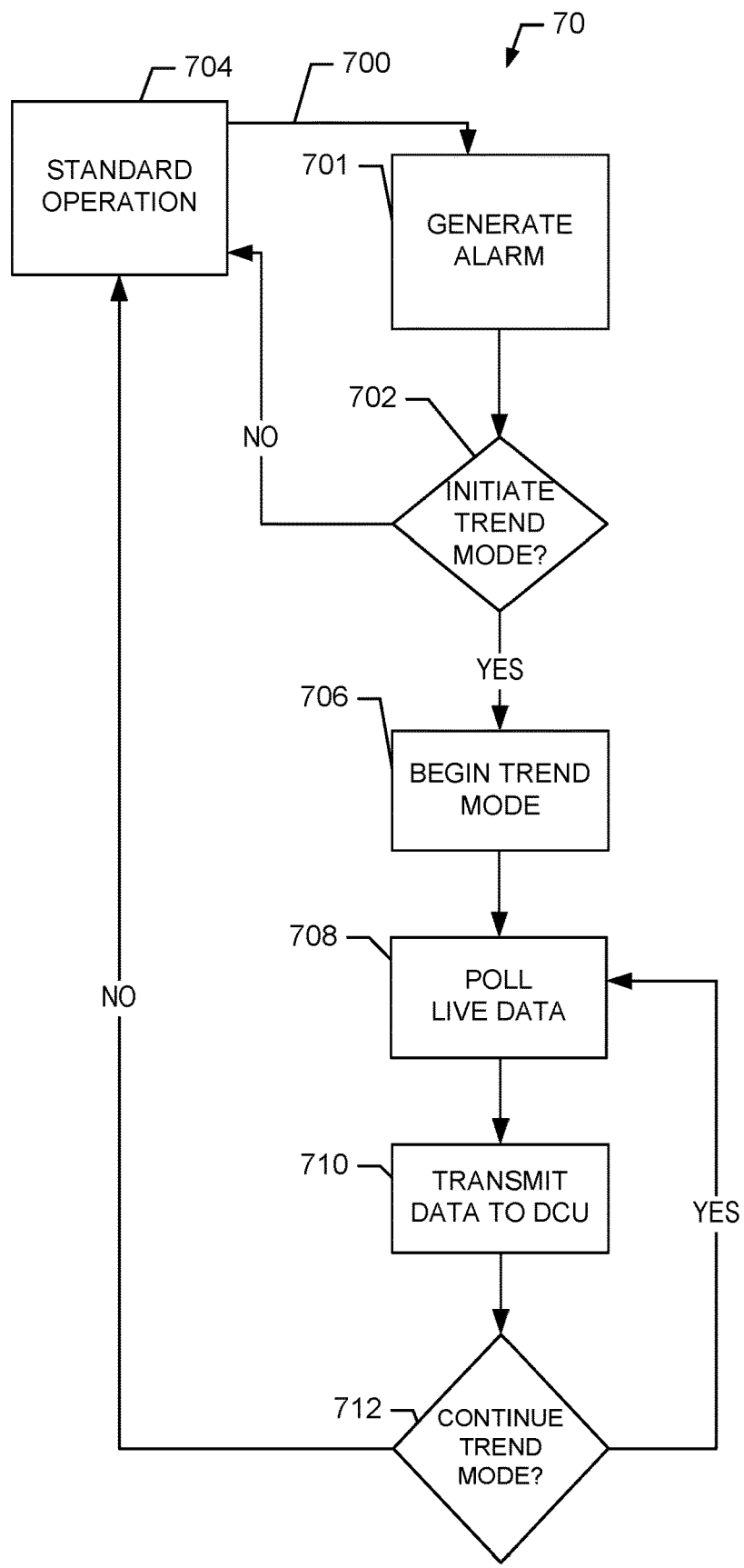
FIG. 7 is a flowchart of a method for live monitoring of the utility monitoring system according to one embodiment.
Figure 8:
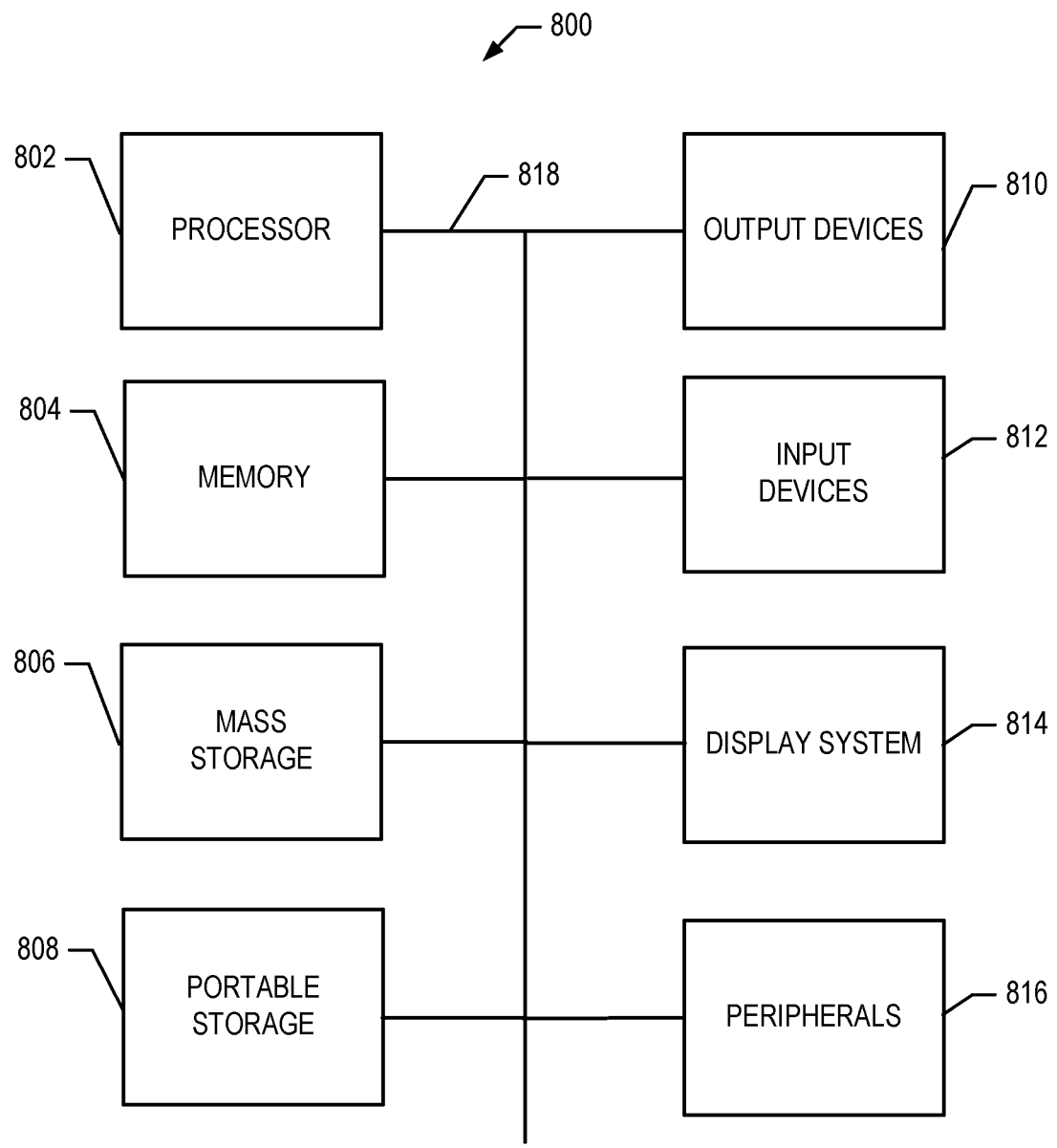
FIG. 8 is a block diagram of an exemplary computing device that may be used to perform various functions of the utility monitoring system according to one embodiment.

FIG. 7 is a flowchart of a method 70 of live monitoring the system under a trend mode of operation according to one embodiment. At 700, the sensory unit monitors a portion of the utility network and generates an alarm signal as determined by pre-set alarm conditions or data thresholds at 701. At 702, the alarm is received at the telemetry unit that wakes from a sleep mode, if necessary, and determines if the alarm signal meets user-defined criteria to initiate a trend mode of operation. If the alarm signal does not meet the criteria, then the telemetry unit continues standard operation at 704. If the alarm signal does meet the criteria, the telemetry unit automatically begins operating in trend mode at 706. The telemetry unit polls the sensory unit at the trend mode intervals to gather live data reads at 708, while compiling the live reads and transmitting the data to the data collection unit at 710. At 712, the telemetry unit determines if it should continue operation in trend mode. In one aspect, the telemetry unit remains in trend mode operation until the alarm signal from the sensory unit is terminated, a command to terminate trend mode operation is received from the headend, or a user-defined period of trend mode operation has expired. If the conditions to terminate trend mode operation are not present at 712, the telemetry unit continues to poll the sensory unit for live data reads. FIG. 8 illustrates an exemplary computing system 800 that may be used to implement an embodiment of the present invention. In particular, the computing system 800 may be present within the sensory unit 110, the telemetry unit 120, the data collection unit 130, and the headend 140.

The computing system of FIG. 8 includes one or more processors 802 and memory 804. Main memory 804 stores, in part, instructions and data for execution by the processor 802. Main memory 804 can store the executable code when in operation. The system of FIG. 8 may further include a mass storage device 806, portable storage medium drive(s) 808, output devices 810, user input devices 812, a graphics display 814, and peripheral devices 816.

The components shown in FIG. 8 are depicted as being connected via a single bus 818. However, the components may be connected through one or more data transport means. For example, the processor unit 802 and main memory 804 may be connected via a local microprocessor bus, and the mass storage device 806, peripheral device(s) 816, portable storage device 808, and display system 814 may be connected via one or more input/output (I/O) buses.

The mass storage device 806, which may be implemented with a magnetic disk drive or an optical disk drive, is a non-volatile storage device for storing data and instructions for use by processor unit. The mass storage device 806 can store the system software for implementing embodiments of the present invention and for purposes of loading that software into main memory 804.

The portable storage device 808 operates in conjunction with a portable non-volatile storage medium, such as a floppy disk, compact disk, flash drive, or digital video disc, to input and output data and code to and from the computer system of FIG. 8. The system software for implementing embodiments of the present invention may be stored on such a portable medium and input to the computer system via the portable storage device 808.

Input devices 812 provide a portion of a user interface. Input devices 812 may include an alphanumeric keypad, such as a keyboard, for inputting alphanumeric and other information, or a pointing device, such as a mouse, a trackball, stylus, or cursor direction keys. Additionally, the system 800 as shown in FIG. 8 includes output devices 810. Examples of suitable output devices 810 include speakers, printers, network interfaces, and monitors.

The display system 814 may include a liquid crystal display (LCD) or other suitable display device. The display system 814 receives textual and graphical information, and processes the information for output to the display device. Peripherals 816 may include any type of computer support device to add additional functionality to the computer system. For example, peripheral device(s) may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The various computing devices 800 disclosed herein include computer readable media (CRM) in memory 804 on which the described applications and software are stored. The computer readable media may include volatile media, nonvolatile media, removable media, non-removable media, and/or another available medium that can be accessed by the processor 802. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen to explain the principles of the technology, its practical application, and to enable others skilled in the art to utilize the technology in various embodiments and with various modifications as are suited to the particular use contemplated. It is intended that the scope of the technology be defined by the claim.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

What is claimed is:

1. A system for reporting utility data comprising:
a sensor configured to monitor one or more portions of a utility network and generate sensor data based on the monitored portions, the at least one sensor in communication with a telemetry unit separate from the sensor, the telemetry unit including at least one transceiver;
the telemetry unit in communication with a data collection unit via the at least one transceiver, wherein the telemetry unit transmits pre-recorded sensor data received from the sensor to the data collection unit at a first interval, wherein the sensor data is received and recorded at the telemetry unit between transmissions to the data collection unit; wherein the telemetry unit is further configured to request real time or near real time sensor data from the sensor in response to receiving an alarm signal from the sensor;
wherein the telemetry unit transmits the real time or near real time sensor data to the data collection unit at a second interval via the at least one transceiver, wherein the second interval is shorter than the first interval; and wherein the telemetry unit transmits the pre-recorded sensor data at the first interval and the real time or near real time data at the second interval simultaneously during an alarm condition via the at least one transceiver.

2. The system of claim 1, wherein the alarm signal is generated in response to the sensor data generated by the sensor.

3. The system of claim 1, wherein the telemetry unit transmits the real time or near real time sensor data at the second interval if the alarm signal exceeds a user-defined threshold.

4. The system of claim 3, wherein the telemetry unit transmits the pre-recorded sensor data at the first interval and the real time or near real time sensor data at the second interval simultaneously while the real time or near real time sensor data exceeds the user-defined threshold.

5. The system of claim 1, wherein the system further comprises a plurality of telemetry units from a wide geographic area.

6. The system of claim 1, wherein the real time or near real time sensor data transmitted at the second interval is different than pre-recorded sensor data sent at the first interval.

7. The system of claim 1, wherein the second interval is variable.

8. The system of claim 1, wherein generated sensor data includes one or more of temperature, water level, waste level, flow rates, and pressure.

9. The system of claim 8, wherein the real time or near real time data includes one or more past data read.

10. The system of claim 1, wherein transmission of the real time or near real time data to the data collection unit at the second interval is initiated by a user.

11. A method for reporting utility data comprising:
monitoring a portion of a utility network with a plurality of sensory units to acquire sensor data associated with the monitored portion of the utility network;
transmitting pre-recorded standard data, received from the sensory units, from a telemetry unit separate from the plurality of sensory units to a data collection unit at a standard interval, wherein standard mode data is received and recorded at the telemetry unit between transmissions to the data collection unit and is based on the acquired sensor data;
receiving an alarm signal at a telemetry unit from at least one of the sensory units;
determining if the alarm signal meets user-defined criteria;
automatically initiating a trend mode operation at the telemetry unit in response to the alarm signal being determined to meet the user-defined criteria;
requesting trend data from the sensory units at a trend mode interval in response to initiating the trend mode operation, wherein the trend data includes real time or near real time data from the sensory units; and
transmitting the requested trend data to the data collection unit at a trend interval and the pre-recorded standard data at the standard interval simultaneously as long as the alarm signal is received.

12. The method of claim 11, wherein generating the alarm signal occurs in response to the acquired sensor data exceeding a user-defined threshold.

13. The method of claim 11, wherein the acquired sensor data includes one or more of temperature, water level, waste level, flow rate, and pressure.

14. The method of claim 11, wherein the trend interval is less than the standard interval.

15. The method of claim 11, wherein the trend interval is greater than the standard interval.

16. The method of claim 11, wherein transmitting the trend data to the data collection unit at the trend interval further comprises transmitting multiple data sets.

17. The method of claim 11, wherein the trend interval is variable.

18. The method of claim 11, wherein transmitting the trend data to the data collection unit at a trend interval comprises transmitting real-time or near real time trend data and one or more past trend data sets.

19. The method of claim 11, further comprising initiating the transmission of the trend data to the data collection unit at the trend interval in response to an input by a user.

20. The method of claim 11, further comprising receiving standard data and trend data from a plurality of telemetry units covering a wide geographic area.

* * * * *